United States Patent [19]

Driscoll et al.

[11] 3,987,015

[45] Oct. 19, 1976

[54] PROCESS FOR THE PRODUCTION OF PARTICULATE POLYMERIC MATERIAL HAVING AN UNUSUALLY HIGH SURFACE AREA

[75] Inventors: Charles P. Driscoll, Gillette, N.J.; Thaddeus E. Helminiak, Dayton, Ohio

[73] Assignees: Celanese Corporation, New York, N.Y.; The United States of America, Washington, D.C. ; part interest to each

[22] Filed: Nov. 18, 1974

[21] Appl. No.: 524,751

[52] U.S. Cl. .................... 260/78 TF; 260/47 CP; 260/49; 260/78 S; 260/78.41
[51] Int. Cl.² ............ C08G 69/48; C08G 73/18; C08G 73/20; C08G 73/22
[58] Field of Search .......... 260/47 CP, 78 TF, 78 A, 260/78.4 E, 78 S, 49

[56] References Cited
UNITED STATES PATENTS

| | | | |
|---|---|---|---|
| 3,301,828 | 1/1967 | Marvel | 260/78.4 |
| 3,313,783 | 4/1967 | Iwakura et al. | 260/78 |
| 3,470,140 | 9/1969 | Salle et al. | 260/78 |
| 3,541,036 | 11/1970 | Libackyj | 260/29.2 |
| 3,573,260 | 3/1971 | Morello | 260/78 |
| 3,574,170 | 4/1971 | Chenevey | 260/78.4 |
| 3,761,445 | 9/1973 | Balme et al. | 260/47 CP |
| 3,784,517 | 1/1974 | Hedberg | 260/63 R |

*Primary Examiner*—Lester L. Lee

[57] ABSTRACT

An improved process is provided for the precipitation of a polymer from a solution to form a particulate polymeric material exhibiting an unusually high surface area, i.e. having a surface area of at least 125 square meters per gram. A non-solvent for the polymer initially is added to the polymer solution until the solution is rendered turbid, a specified additional quantity of the non-solvent is added to the solution, and the resulting turbid solution is added to a major quantity of the non-solvent under conditions found capable of yielding the desired particulate polymeric material. High surface area particles of a BBB type polymeric material are formed in a preferred embodiment of the process. The resulting particles are rendered more readily compactable to form three-dimensional shaped articles, etc. because of their increased surface energy resulting from the large surface area.

14 Claims, No Drawings

PROCESS FOR THE PRODUCTION OF PARTICULATE POLYMERIC MATERIAL HAVING AN UNUSUALLY HIGH SURFACE AREA

BACKGROUND OF THE INVENTION

Various precipitation techniques have been proposed for obtaining a particulate polymeric material from a polymer solution. For instance, commonly a non-solvent is added to a polymer solution while undergoing agitation until the polymer is no longer dissolved. Alternatively, the polymer solution may be added to a non-solvent while undergoing agitation to precipitate the polymer. Commonly such prior art polymer precipitation techniques have yielded a particulate material of relatively low surface area, i.e. particles having a surface area below about 5 square meters per gram.

There accordingly has remained a need for a simple procedure capable of increasing the surface area when the polymeric material is intended for specialized industrial applications wherein such parameter is of importance. While milling and grinding of the previously precipitated particles advantageously will reduce the particle size to some degree and possibly increase the surface area, such additional processing often is highly time consuming and even then may be incapable of yielding the desired extremely small particles, particularly if the polymeric material involved is a high temperature resistant intractable polymer of the BBB type.

U.S. Ser. No. 424,996, filed Dec. 14, 1973, discloses one approach wherein a BBB type polymer is formed under polymerization conditions wherein polymer particles of unusually high surface area inherently are formed.

It is an object of the present invention to provide an improved process for yielding a particulate polymeric material having an unusually high surface area.

It is an object of the invention to provide an improved process wherein a dissolved preformed polymeric material readily may be transformed to a particulate polymeric material of unusually high surface area, i.e. at least 125 square meters per gram.

It is another object of the invention to provide an improved process wherein dissolved preformed BBB type polymer readily may be transformed to a particulate polymeric material of unusually high surface area.

These and other objects, as well as the scope, nature, and utilization of the present invention will be apparent from the following detailed description and appended claims.

SUMMARY OF THE INVENTION

It has been found that in a process for the precipitation of a polymer from a solution of the same by admixture with a non-solvent for the polymer to form a particulate polymeric material improved results are achieved by:

a. initially adding to the solution of the polymer while under agitation a non-solvent for the polymer in a minor quantity sufficient to render the solution turbid, b. adding to the turbid solution while under agitation an additional quantity of the non-solvent which exceeds that introduced in step (a) by about 10 to 20 percent by volume, c. adding the resulting turbid solution to a major quantity of the non-solvent while under agitation at a rate of at least 1.0 ml./minute to form a particulate polymeric material, and d. recovering the particulate polymeric material having a surface area of at least 125 square meters per gram.

DESCRIPTION OF PREFERRED EMBODIMENTS

The chemical structure of the polymer which is precipitated in accordance with the process of the present invention may be varied widely. Representative classes of polymers for use in the present process include BBB type polymer, polybenzimidazoles, aromatic polyamides, polybenzothiazoles, polybenzoxazoles, etc.

The process of the present invention particularly is suited for use with high temperature resistant polymers which are considered to be intractable and to lack plastic flow characteristics exhibited by conventional thermoplastic polymers. Such polymers are particularly difficult to grind or to mill to a small particle size.

Representative intractable polymers for use in the process include the polymers of the BBB type [i.e. poly(bisbenzimidazobenzophenanthroline) and related nitrogenous polymers]. Such BBB type polymers may be of either of the semi-ladder (i.e. have a combination of cyclic and non-cyclic C—C single bonds in the polymer chain) or ladder (i.e. have an entirely cyclic structure with no C—C single bond as the sole link in the polymer chain) variety. The latter polymer variety sometimes is identified as a BBL polymer.

As is now otherwise known in the art, BBB type polymers may be formed by condensing at least one organic tetra-amine with at least one tetracarboxylic acid (which also may be in the form of the corresponding half anhydride or dianhydride).

The organic tetra-amine reactant may have the structural formula

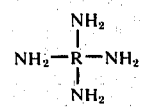

wherein R is an aromatic or cycloaliphatic tetravalent radical and wherein each of the four amino groups is attached directly to a carbon atom present in a ring of said aromatic or cycloaliphatic radical in a position which is ortho or peri to another carbon atom to which another of said amino groups is also directly attached. When R is an amino substituted bicyclic ring compound, such as tetra-amino substituted naphthalene, the carbon atoms at the 1 and 8 positions are considered to be peri to each other as are the carbon atoms at the 4 and 5 positions. Five or six member rings are formed depending upon whether R is ortho or peri amino substituted respectively, as will be apparent to those skilled in the art. It is preferred that R be an aromatic radical rather than a cycloaliphatic radical. It is preferred that R contain up to about 20 carbon atoms.

Non-limiting examples of the tetra-amine monomers which may be used individually or in mutual admixture when forming the BBB type polymers are: 3,3'-diaminobenzidine; bis(3,4-diamino phenyl) methane; 1,2-bis(3,4-diamino phenyl) ethane; 2,2-bis(3,4-diamino phenyl) propane; bis(3,4-diamino phenyl) ether; bis(3,4-diamino phenyl) sulfide; bis(3,4-diamino phenyl) sulfone; 1,2,4,5-tetra-amino benzene; 1,4,5,8- tetra-amino-naphthalene; 2,3,6,7-tetra-aminonaphthalene; etc; and the corresponding ring hydrogenated tetra-amines.

The tetracarboxylic acid reactant (which also may be in the form of the corresponding half anhydride or dianhydride) may have the structural formula

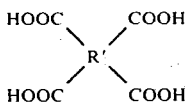

wherein R' is a tetravalent aromatic or cycloaliphatic radical wherein each of the four carboxyl groups is attached directly to a carbon atom present in a ring of said aromatic or cycloaliphatic radical in a position which is ortho or peri to another carbon atom to which another of said carboxyl groups is also directly attached. When R' is a carboxyl substituted bicyclic fused ring compound such as tetra-carboxyl naphthalene, the carbon atoms at the 1 and 8 positions are considered to be peri to each other, as are the carbon atoms at the 4 and 5 positions. Five or six member rings are formed depending upon whether R' is ortho or peri carboxyl substituted respectively, as will be apparent to those skilled in the art. It is preferred that R' be an aromatic radical rather than a cycloaliphatic radical. It is preferred that R' contain up to about 20 carbon atoms.

Non-limiting examples of the tetracarboxylic acids which may be used in forming the BBB type polymers include: pyromellitic acid, i.e. 1,2,4,5-benzenetetracarboxylic acid; 2,3,6,7-naphthalene tetracarboxylic acid; 3,3',4,4'-diphenyl tetracarboxylic acid; 1,4,5,8-naphthalene tetracarboxylic acid; 2,2',3,3'-diphenyl tetracarboxylic acid; 2,2-bis(3,4-dicarboxyphenyl) propane; bis(3,4-dicarboxyphenyl) sulfone; 3,4,9,10-perylene tetracarboxylic acid; bis(3,4-dicarboxyphenyl) ether; ethylene tetracarboxylic acid; naphthalene-1,2,4,5-tetracarboxylic acid; decahydronaphthalene-1,4,5,8-tetracarboxylic acid; 4,8-dimethyl-1,2,3,5,6-hexahydronaphthalene-1,2,5,6-tetracarboxylic acid; 2,6-dichloronaphthalene-1,4,5,8-tetracarboxylic acid; 2,7-dichloronaphthalene-1,4,5,8-tetracarboxylic acid; 2,3,6,7-tetrachloronaphthalene-1,4,5,8-tetracarboxylic acid; phenanthrene-1,8,9,10-tetracarboxylic acid; cyclopentane-1,2,3,4-tetracarboxylic acid; pyrrolidine-2,3,4,5-tetracarboxylic acid; pyrazine-2,3,5,6-tetracarboxylic acid; 2,2-bis(2,3-dicarboxyphenyl)propane; 1,1-bis(2,3-dicarboxyphenyl) methane; bis(3,4-dicarboxyphenyl) methane; benzene-1,2,3,4-tetracarboxylic acid; 1,2,3,4-butane tetracarboxylic acid; thiophene-2,3,4,5-tetracarboxylic acid; and similar acids, as well of the half anhydrides (i.e. mono anhydrides) or dianhydrides of such acids. The preferred tetracarboxylic acids contain carboxyl groups peri substituted upon a naphthalene nucleus.

The intractable BBB type polymers may be formed in accordance with known techniques, and commonly exhibit an inherent viscosity of at least 0.5 dl./gram (e.g. 1.0 to 5.0 dl./gram). The inherent viscosity may be measured at 25° C. at a concentration of 0.4 g. of polymer per 100 ml. of solvent. Ninety-seven percent sulfuric acid (by weight) is a convenient and preferred solvent for the purpose of this invention though other solvents may be used similarly. The viscosity of the polymer solution is measured relative to that of the solvent alone and the inherent viscosity (I.V.) is determined from the following equation:

$$I.V. = \frac{\ln \frac{V_2}{V_1}}{C}$$

In the above formula, $V_2$ is the efflux time of the solution, $V_1$ is the efflux time of the solvent, and C is the concentration expressed in grams of polymer per 100 ml. of solution. As is known in the polymer art, inherent viscosity is monotonically related to the molecular weight of the polymer. Representative techniques for forming the BBB type polymers are disclosed in commonly assigned U.S. Pat. Nos. 3,539,677; 3,574,170; 3,574,171; 3,792,024; and 3,798,201; and U.S. Ser. No. 415,706, filed Nov. 14, 1973 (now U.S. Pat. No. 3,864,310) which herein are incorporated by reference.

Representative techniques for forming polybenzimidazole polymers are disclosed in U.S. Pat. Nos. 2,895,948; 3,174,947; 3,433,772; 3,509,108; and 3,549,603 which are herein incorporated by reference. The particularly preferred polybenzimidazole for use in the process is poly-2,2'-(m-phenylene)5,5'-bibenzimidazole.

Aromatic polyamides may be formed by reaction of an aromatic diamine and an aromatic acid chloride in accordance with known techniques. For instance, poly(m-phenyleneisophthalamide) may be formed by the reaction of m-phenylenediamine and isophthaloyl chloride.

The polybenzothiozoles may be prepared from 3,3'-dimercaptobenzidine and the diacid, diphenyl ester, diacid chloride, etc. (e.g. diphenyl isophthalate). See "Polybenzothiazoles, I: Synthesis and Preliminary Stability Evaluation", by P. M. Hergenrother, W. Wrasidlo, and H. H. Levine, J. Polymer Sci., part A., vol. 3, pp. 1665–1674.

The polybenzoxazoles may be formed in accordance with known techniques. For instance, 4,4'-dihydroxy-m-benzidine and isophthaloyl chloride (or isophthalamide) may be utilized in the synthesis.

The polymer initially is provided as a solute while dissolved in a solvent for the same. The nature of the solvent and the concentration of the polymer therein may be varied so long as the polymer undergoes no substantial chemical reaction or degradation while dissolved therein. A true solution of the polymer is formed which exhibits no Tyndall effect due to the scattering of light by minute particles of dispersed (i.e. non-dissolved) polymer. When the polymer is a BBB type polymer, solvents such as sulfuric acid, methane sulfonic acid, polyphosphoric acid, chlorosulfonic acid, etc. conveniently may be selected and the polymer dissolved therein in a concentration of about 0.1 to 5.0 (e.g. 0.2 to 0.8) percent by weight based upon the total weight of the solution. When the polymer is a polybenzimidazole, solvents such as sulfuric acid, methane sulfonic acid, etc. conveniently may be selected and the polymer dissolved therein in a concentration of about 0.1 to 10 (e.g. 0.2 to 1.0) percent by weight based upon the total weight of the solution. Conventional solutioning techniques may be employed.

In the initial step of the process the polymer is agitated and a minor quantity of non-solvent for the polymer is added to the same until the solution is rendered turbid. The quantity of non-solvent required to bring about the turbidity is determined. The presence of turbidity may be detected by observing the onset of the Tyndall effect due to the scattering of light by minute particles of dispersed (i.e. non-dissolved) polymer. During the addition of the non-solvent the agitation of the solution may be accomplished through the use of a central stirrer, etc. The temperature of the solution during the initial non-solvent addition should be maintained at a substantially constant temperature so solubility variability resulting from temperature change is minimized.

When the solution is a BBB type polymer dissolved in sulfuric acid or methane solfonic acid, it is preferably maintained at a temperature of about 5° to 25° C. (e.g. 10° to 15° C.) by contact of the vessel containing the same with a cooling medium so that the exothermic nature of the non-solvent addition is readily controlled. Preferred non-solvents for use with such solutions of BBB type polymer are the $C_1$ to $C_3$ alcohols (e.g. methanol, ethanol, propanol, isopropanol). The particularly preferred non-solvent for use with such solutions of BBB type polymer is methanol.

When the solution is a polybenzimidazole dissolved in sulfuric acid, preferred non-solvents also are the $C_1$ to $C_3$ alcohols (e.g. methanol, ethanol, propanol, isopropanol).

While agitation of the turbid solution continues, an additional quantity of the non-solvent is added to the solution which exceeds that added in the previous step by about 10 to 20 percent by volume, and preferably exceeds that added in the previous step by about 12 to 18 percent by volume (e.g. 14 to 16 percent by volume). During the addition of the additional quantity of non-solvent it is observed that the turbid solution exhibits an increasingly greater degree of light scattering. Throughout such subsequent addition of non-solvent the temperature of the solution preferably is maintained at a substantially constant temperature which approximates that exhibited during the initial non-solvent addition.

It has been found that if the additional quantity of non-solvent is not introduced as described above, then the particulate polymeric material produced in the next step of the process will be substantially larger in particle size, and substantially lower in surface area.

The resulting turbid solution containing an excess of the non-solvent as previously described next is added at a rate of at least 1.0 ml./minute (e.g. at a rate of 1.0 to 2.0 ml./minute) to a major quantity of the non-solvent which is under agitation to form a particulate polymeric material having a surface area of at least 125 square meters per gram. The agitation of the non-solvent may be accomplished through the use of a central stirrer, high shear mixer, etc. The major quantity of non-solvent preferably is maintained at a temperature of about 5° to 25° C. while the resulting turbid solution is added. When the resulting turbid solution is added at a rate of less than about 1.0 ml./minute, it has been found that the particle size of the polymer will be substantially larger and the surface area will be substantially lower. In a preferred embodiment of the process the resulting turbid solution is added at a rate of at least 1.5 ml./minute (e.g. at a rate of 1.5 to 2.0 ml./minute).

In accordance with the process parameters described above a polymeric material of unusually high surface area is produced having a surface area of at least 125 square meters per gram (e.g. 125 to 500 square meters per gram), and preferably a surface area of at least 225 square meters per gram (e.g. 225 to 500 square meters per gram). Following recovery of the product as described hereafter the surface area of the product may be determined by standard BET analysis.

The particulate polymeric material is next recovered under conditions incapable of bringing about the bonding of adjoining particles and the destruction of the high surface area. For instance, the particles may be separated by filtration, washed, and wash medium removed. For instance, when the polymeric material is a BBB type polymer, the particles may be separated on a paper filtration medium, washed with methanol, washed with a mixture of methanol and diethylether, washed with a mixture of diethylether and benzene, and finally freeze dried at 0° C. to remove the wash medium. It is recommended that the resulting polymeric material not be allowed completely to dry prior to the final freeze drying step. The resulting product exhibits a porous and sponge-like appearance when examined under a scanning electron microscope.

The theory whereby the process of the present invention is capable of producing particulate polymeric material of an unusually high surface area as described is considered to be complex and incapable of simple explanation. It has been demonstrated that the parameters heretofor described with respect to non-solvent addition beyond the point of turbidity, and the rate at which the resulting turbid solution is added to the non-solvent must be strictly adhered to if one is to yield a precipitate of the desired particle size.

The resulting particulate polymeric material is suited for use in those end use applications where a high surface area is advantageous. For instance, the resulting particles are capable of undergoing a high degree of compaction or densification which is desirable when forming three-dimensional shaped articles. Alternatively, other representative end use applications include: catalyst supports, packing material for chromatographic separations, etc.

The following examples are given as specific illustrations of the invention. It should be understood, however, that the invention is not limited to the specific details set forth in the examples.

EXAMPLE I

A poly(bisbenzimidazobenzophenanthroline) having an inherent viscosity of 2.35 dl./gram is completely dissolved in a 97% surfuric acid solvent in a concentration of 0.4 percent by weight based upon the total weight of the solution. The poly(bisbenzimidazobenzophenanthroline) was formed by the condensation of 1,4,5,8-naphthalene tetracarboxylic acid and 3,3'-diamino benzidine to form a semi-ladder polymer one isomer of which is illustrated by the equation:

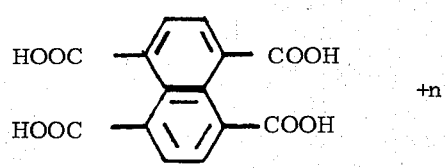
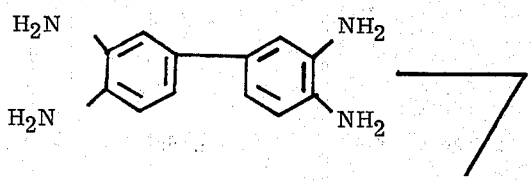

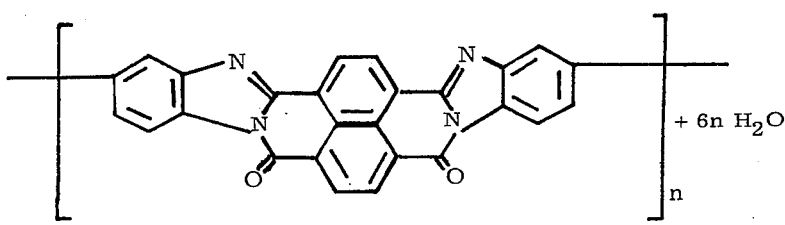

The specific isomer illustrated may be identified as poly[6,9-dihydro-6,9-dioxobisbenzimidazo(2,1-b:1',2'-j)benzo(1mn) (3,8) phenanthorline-2,13-diyl]. It will be apparent to those skilled in the art that various additional isomers will also be produced during the condensation reaction.

Twenty-eight parts by weight of the solution are placed in a vessel provided with a central high shear agitator. After the addition of 18 parts by volume methanol at a rate of about 1.5 ml./min. it is observed that the solution has become turbid. Three additional parts by volume of methanol are added to the already turbid solution at a rate of 0.5 ml./min.

The resulting turbid solution consisting of 49 parts by volume is next added at a rate of 1.5 ml./minute to 1400 parts by volume methanol present in a vessel provided with a central high shear agitator. A particulate polymer material having a surface area of 230 square meters per gram is formed.

During product recovery the particulate polymer is collected upon a paper filter, successively washed with methanol/diethyl ether mixtures of 90/10, 80/20, and 70/30 parts by volume, successively washed with diethylether/benzene mixtures of 90/10, 80/20 and 70/30 parts by volume, and finally freeze dried at 0° C.

For comparative purposes Example I is repeated with the exception that the poly(bisbenzimidazobenzophenanthroline) solution is added directly to the major quantity of methanol with no methanol having previously been added to the solution. The resulting particulate polymeric material exhibits a surface area less than 2 square meters per gram.

For comparative purposes Example I is repeated with the exception that the addition of the methanol is terminated as soon as the point of turbidity is reached and no additional methanol is added to the polymer solution prior to its introduction into the major quantity of methanol. The resulting particulate polymeric material exhibits a surface area of only 40 square meters per gram.

For comparative purposes Example I is repeated with the exception that the resulting turbid solution is added to the major quantity of methanol at a rate of only 0.5 ml./minute. The resulting particulate polymeric material exhibits a surface area of only 48 square meters per gram.

For comparative purposes Example I is repeated with the exception that the addition of methanol is terminated as soon as the point of turbidity is reached and no additional methanol is added to the polymer solution prior to its introduction into the major quantity of methanol at a rate of only 0.5 ml./minute. The resulting particulate polymeric material exhibits a surface area of only 4.4 square meters per gram.

EXAMPLE II

A polybenzimidazole having an inherent viscosity of 0.75 dl./gram is completely dissolved in a 97 percent sulfuric acid solvent in a concentration of 0.4 percent by weight based upon the total weight of the solution. The polybenzimidazole was formed by the condensation of diphenylisophthalate and 3,3'-diamino benzidine to form a poly-2,2'-(m-phenylene)-5,5'-bibenzimidazole polymer the recurring unit of which is:

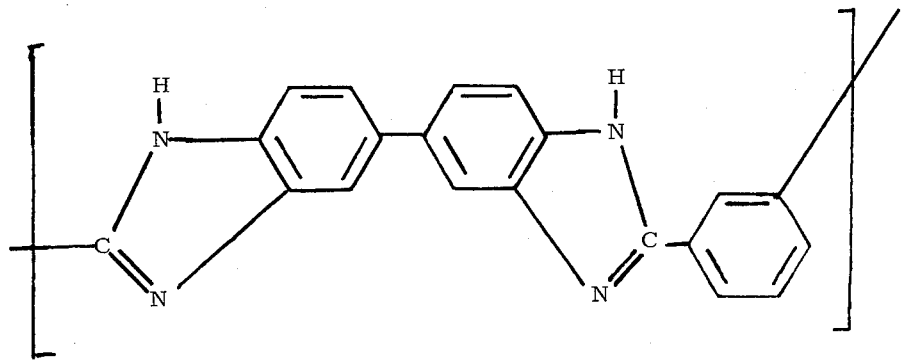

Twenty-five parts by weight of the solution are placed in a vessel provided with a central high shear agitator. After the addition of 9.5 parts by volume methanol at a rate of 1.5 ml./min. it is observed that the solution has become turbid. 1.5 additional parts by volume of methanol are added to the already turbid solution at a rate of 0.5 ml./min.

The resulting turbid solution consisting of 36 parts by volume is next added at a rate of 1.5 ml./min. to 1400 parts by volume methanol present in a vessel provided with a central high shear agitator. A particulate polymer material having a surface area of 140 square meters per gram is formed.

During product recovery the particulate polymer is collected upon a paper filter, successively washed with methanol/diethyl ether mixtures of 90/10, 80/20, and 70/30 parts by volume, successively washed with diethylether/benzene mixtures of 90/10, 80/20, and 70/30 parts by volume, and finally freeze dried at 0° C.

Although the invention has been described with preferred embodiments, it is to be understood that variations and modifications may be resorted to as will be apparent to those skilled in the art. Such variations and modifications are to be considered within the purview and scope of the claims appended hereto.

We claim:

1. In a process for the precipitation of a polymer selected from the group consisting essentially of a BBB type polymer formed by the condensation of at least one organic tetra-amine with at least one tetra-carboxylic acid or its corresponding half anhydride or dianhydride, polybenzimidazoles, aromatic polyamides, polybenzothiazoles, and polybenzoxazoles from a solution of the same by admixture with a non-solvent for said polymer to form a particulate polymeric material; the improvement comprising:
   a. initially adding to said solution of said polymer while under agitation a non-solvent for said polymer in a minor quantity sufficient to render said solution turbid,
   b. adding to said turbid solution while under agitation an additional quantity of said non-solvent which exceeds that introduced in step (a) by about 10 to 20 percent by volume,
   c. adding said resulting turbid solution to a major quantity of said non-solvent while under agitation at a rate of at least 1.0 ml./minute to form a particulate polymeric material, and
   d. recovering said particulate polymeric material having a surface area of at least 125 square meters per gram.

2. An improved process in accordance with claim 1 wherein said polymer is an intractable high temperature resistant polymer.

3. An improved process in accordance with claim 2 wherein said polymer is a BBB type polymer.

4. An improved process in accordance with claim 1 wherein said polymer is a polybenzimidazole.

5. An improved process in accordance with claim 1 wherein the additional quantity of said non-solvent which is added in step (b) exceeds that introduced in step (a) by about 12 to 18 percent by volume.

6. An improved process in accordance with claim 1 wherein said resulting turbid solid is added in step (c) at a rate of at least 1.5 ml./minute.

7. An improved process in accordance with claim 1 wherein said step (d) includes the washing of said particulate polymeric material, and the freeze drying of the same.

8. In a process for the precipitation of an intractable high temperature resistant BBB type polymer formed by the condensation of at least one organic tetra-amine with at least one tetracarboxylic acid or its corresponding half anhydride or dianhydride from a solution of the same by admixture with a non-solvent for said polymer to form a particulate polymeric material; the improvement comprising:
   a. initially adding to said solution of said BBB type polymer while under agitation a non-solvent for said polymer in a minor quantity sufficient to render said solution turbid,
   b. adding to said turbid solution while under agitation an additional quantity of said non-solvent which exceeds that introduced in step (a) by about 12 to 18 percent by volume,
   c. adding said resulting turbid solution to a major quantity of said non-solvent while under agitation at a rate of at least 1.5 ml./minute to form a particulate BBB type polymeric material, and
   d. recovering said particulate BBB type polymeric material having a surface area of at least 125 square meters per gram.

9. An improved process according to claim 8 wherein the solvent for said solution is selected from the group consisting essentially of sulfuric acid, methane sulfonic acid, polyphosphoric acid, and chlorosulfonic acid.

10. An improved process according to claim 8 wherein said non-solvent is a $C_1$ to $C_3$ alcohol.

11. An improved process according to claim 10 wherein said non-solvent is methanol.

12. An improved process according to claim 8 wherein said additional quantity of said non-solvent which is added in step (b) exceeds that introduced in step (a) by about 14 to 16 percent by volume.

13. An improved process in accordance with claim 8 wherein said step (d) includes the washing of said particulate polymeric material, and the freeze drying of the same.

14. An improved process in accordance with claim 8 wherein said BBB type polymer is a condensation product of 1,4,5,8-naphthalene tetracarboxylic acid and 3,3'-diamino benzidine.

* * * * *